C. C. Holcomb.
Gate & Door-Latch.

No. 77,040. Patented Apr. 21, 1868.

Witnesses
O. E. Woodbury
Joseph E. Quelly

Inventor
Charles C. Holcomb

United States Patent Office.

CHARLES C. HOLCOMB, OF MADISON, WISCONSIN.

Letters Patent No. 77,040, dated April 21, 1868.

IMPROVED GATE AND DOOR-LATCH.

*The Schedule referred to in these Letters Patent and making part of the same.*

TO ALL WHOM IT MAY CONCERN:

Be it known that I, CHARLES C. HOLCOMB, of Madison, in the county of Dane, and State of Wisconsin, have made new and useful Improvements in Gate and Door-Latches; and I do hereby declare the following to be a full, clear, and exact description of the nature, construction, and operation of the same, sufficient to enable one skilled in the art to which it appertains to construct and use the same, reference being had to the accompanying drawings, which are made part of this specification, and in which—

Figure 2:
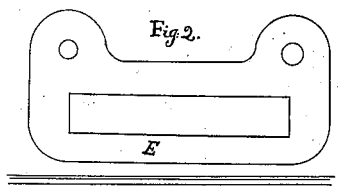
Figure 3:
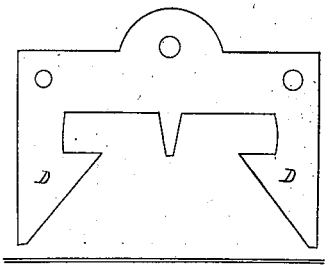
Figure 1:
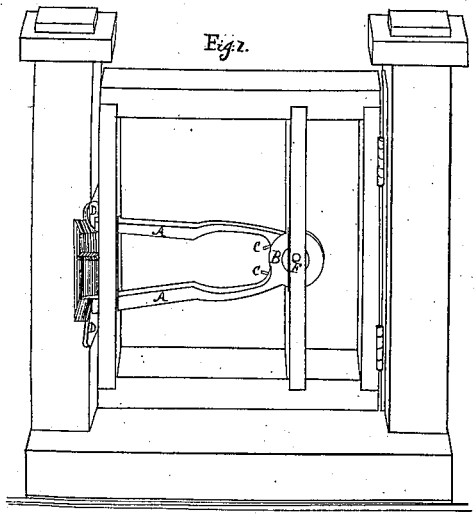
Figure 4:
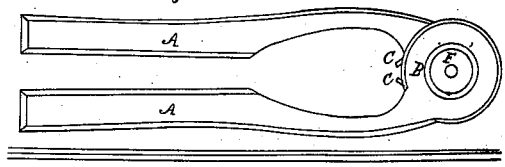

Figure 1 is a front elevation of a gate.
Figure 2 is a view of the guard.
Figure 3 is a view of the catch.
Figure 4 is a side view of the latches.

The invention consists in combining together two latches and a spring or springs, in such a way as, by the operation of the spring, to force the two latches asunder at their outer ends, and thus cause them to slide into their respective catches.

The latches are pivoted at the back end, F, where they are provided with a circular shell, B, one half of which is on each of the latches, A. The spring, C, is confined inside of the shell B, and is coiled around a short tube cast upon the inside of the shell, and in its centre. The ends, C C, of the spring project through the rim of the shell against a notch, in which they take their bearing, this causing the latches to open and revolve slightly upon the pivot, F, and the outer ends of the latches are thus thrown into their catches D D.

Upon compressing the two latches A A, until they are nearly parallel with each other, the outer ends of the same strike against a small pin upon the catch-plate, the centre between the catches, when the gate is readily opened.

The great value of this double latch consists in the fact that the gate cannot be opened unless both of the latches are compressed at the same time, as either of them will securely hold the gate or door shut, when the other is pressed to the centre-pin on the catch-plate. It will be readily seen that unruly animals cannot open this latch.

The guard E is fastened upon the front of the gate or door, as indicated in fig. 1, in such manner as to allow the latches to pass through it, and is designed to receive the blow given when the gate is slammed together.

Having described my invention, what I claim as new, and desire to secure by Letters Patent, is—

Constructing the pivoted ends of each latch with a shell or cup, which, when put together, enclose a coil spring operating upon the latches all together, being suspended by a screw or other device, passing through the centre of the cup and spring and into the gate or door, operating and constructed substantially as described.

CHARLES C. HOLCOMB.

Witnesses:
O. E. WOODBURY,
A. D. THOMAS.